Dec. 8, 1959  R. A. PETERSON  2,916,724
WAVE TRANSMISSION SYSTEM
Filed April 17, 1953  6 Sheets-Sheet 1
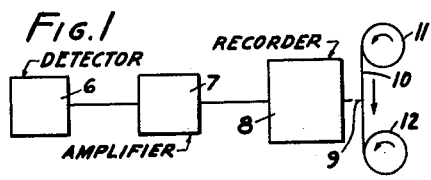
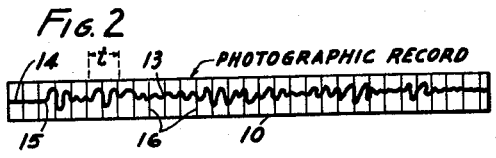
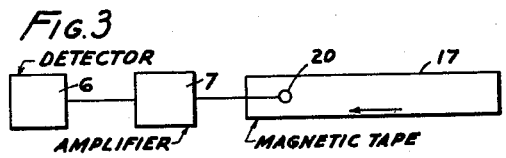
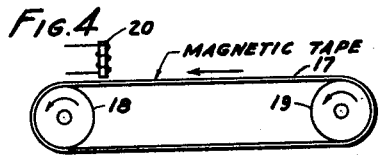
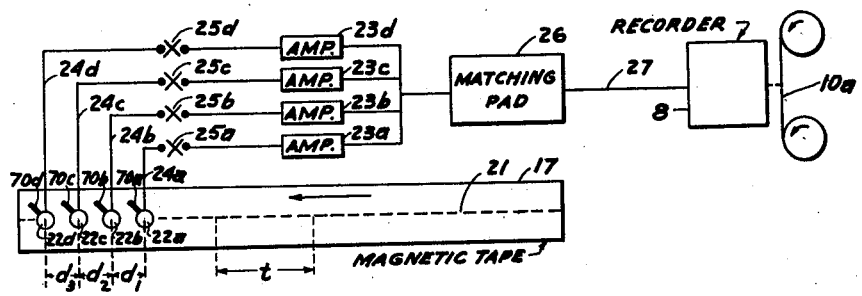
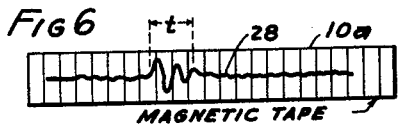
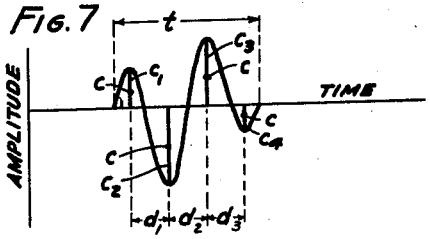
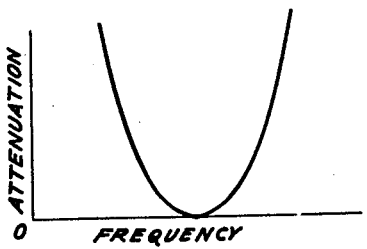
INVENTOR.
RAYMOND A. PETERSON
BY
D. Gordon Angus
ATTORNEY Dec. 8, 1959     R. A. PETERSON     2,916,724
WAVE TRANSMISSION SYSTEM
Filed April 17, 1953     6 Sheets-Sheet 2
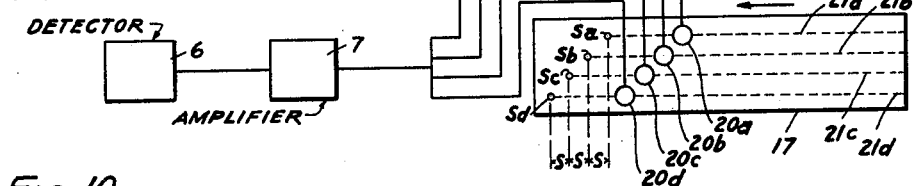
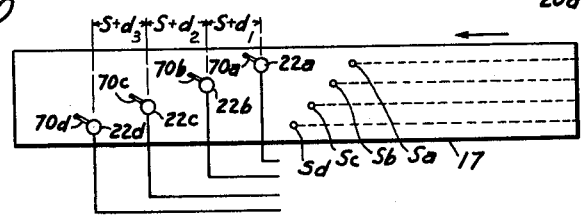
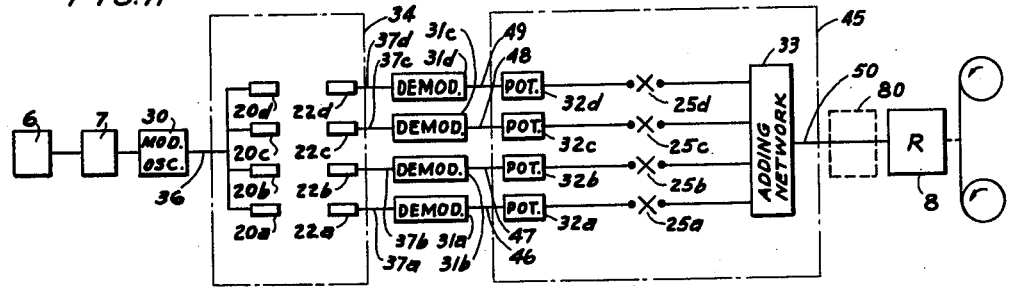
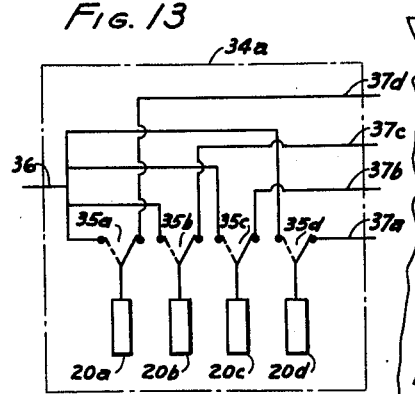
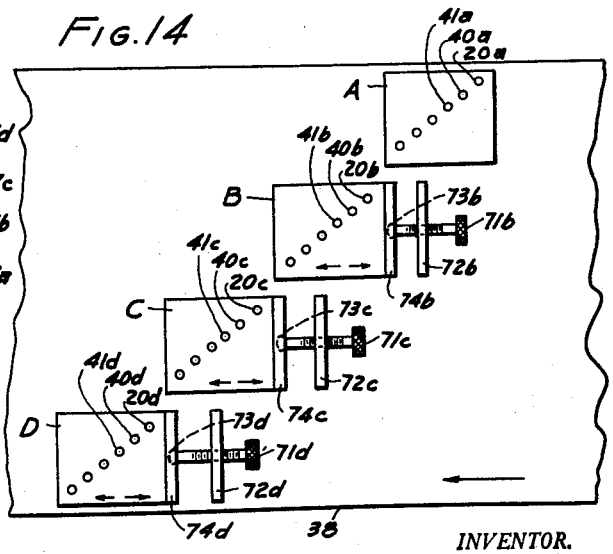
INVENTOR.
RAYMOND A. PETERSON
BY D. Gordon Angus
ATTORNEY.

Dec. 8, 1959   R. A. PETERSON   2,916,724
WAVE TRANSMISSION SYSTEM

Filed April 17, 1953   6 Sheets-Sheet 3

INVENTOR.
RAYMOND A. PETERSON
BY
D. Gordon Angus
ATTORNEY.

Dec. 8, 1959   R. A. PETERSON   2,916,724
WAVE TRANSMISSION SYSTEM
Filed April 17, 1953   6 Sheets-Sheet 4

INVENTOR.
RAYMOND A. PETERSON
BY
*D. Gordon Angus*
ATTORNEY.

Dec. 8, 1959 R. A. PETERSON 2,916,724
WAVE TRANSMISSION SYSTEM
Filed April 17, 1953 6 Sheets-Sheet 5
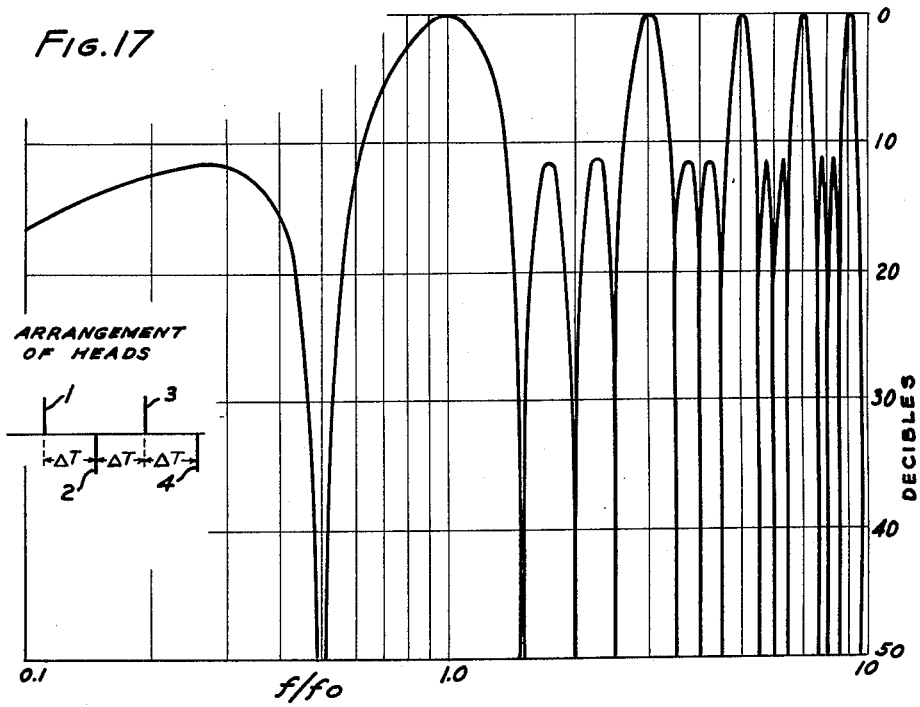
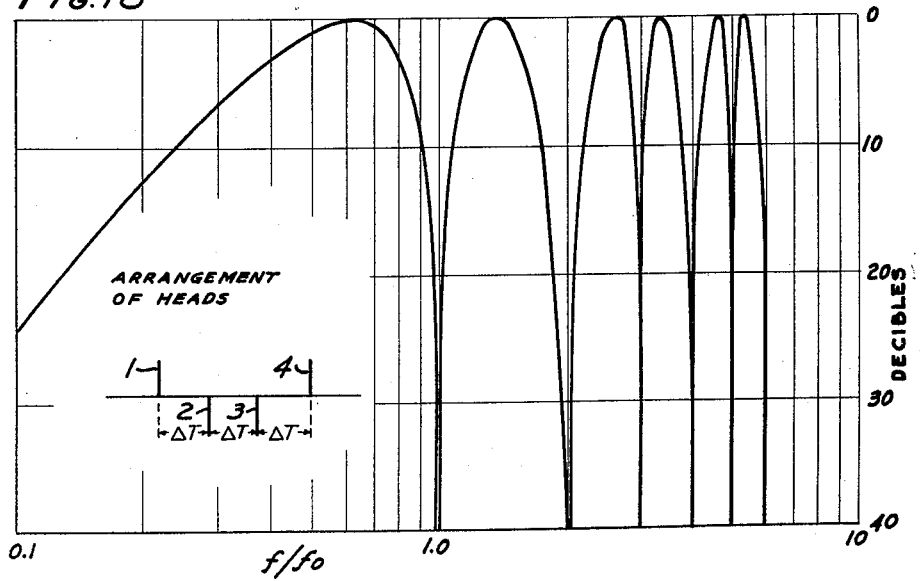
INVENTOR.
RAYMOND A. PETERSON
BY
J. Gordon Angus
ATTORNEY.

Dec. 8, 1959 R. A. PETERSON 2,916,724
WAVE TRANSMISSION SYSTEM
Filed April 17, 1953 6 Sheets-Sheet 6
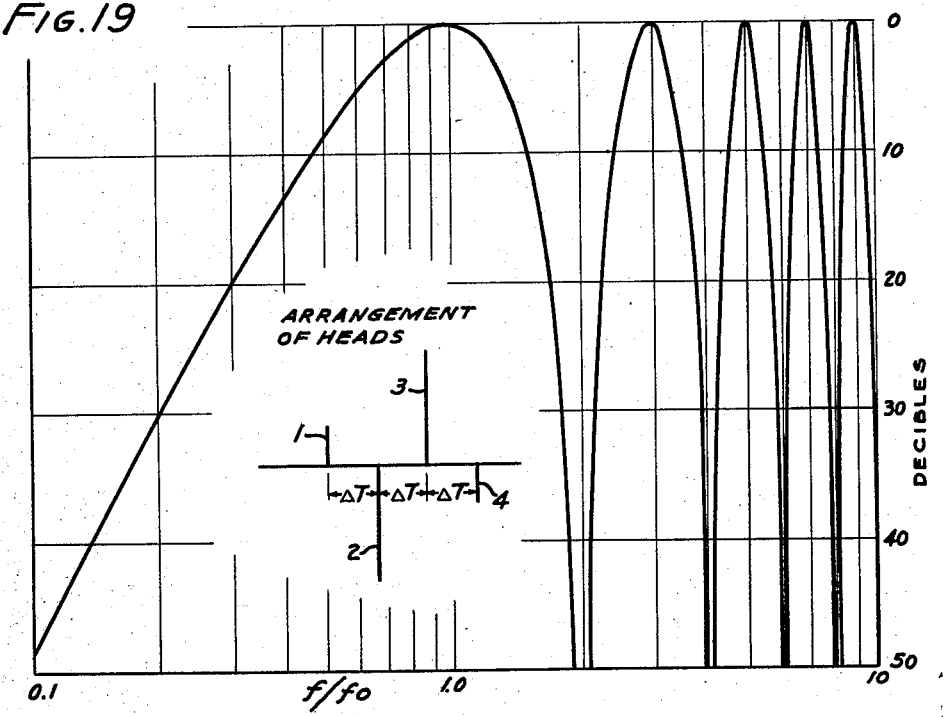
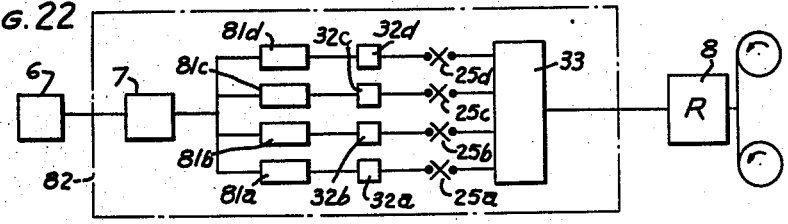
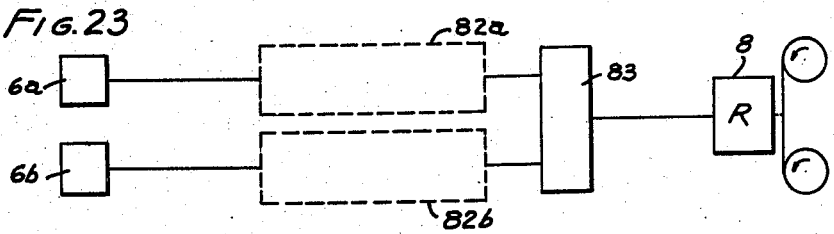
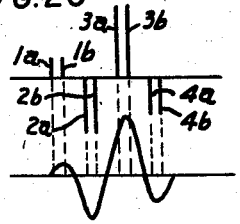 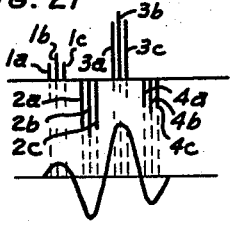
INVENTOR.
RAYMOND A. PETERSON
BY
ATTORNEY.

United States Patent Office 2,916,724
Patented Dec. 8, 1959

2,916,724

WAVE TRANSMISSION SYSTEM

Raymond A. Peterson, Altadena, Calif., assignor, by mesne assignments, to United Geophysical Corporation, Pasadena, Calif., a corporation of California Application April 17, 1953, Serial No. 349,407

18 Claims. (Cl. 340—15)

This invention relates to frequency selecting systems and more particularly to systems for selecting wave transients.

An object of the invention is to provide such a selecting system capable of distinguishing and developing wave transients from among other waves.

It is well known that wave motion occurs in various media such as the earth, air and water from sources such as explosions or other disturbances. Such waves ordinarily travel in various directions and may be reflected or refracted or diffracted in different degrees from objects or surfaces. The result is that such waves commonly travel at random through the medium at various frequencies and amplitudes.

It is desirable for some purposes to be able to select from among such random waves, a particular wave or transient. In general, such a wave transient or portion of a wave is of varying amplitude and changing frequency, but it usually has the characteristic that the frequencies or wave-lengths lie within a relatively narrow range. For example, while the various readily discernible random waves travelling through the medium may lie in the range of about 20 to 2000 cycles per second, it is ordinarily true that the transient which it is desired to select may lie wholly in such a narrow range of frequency as the order of 40 to 50 cycles per second. Ordinarily, the transient can be sufficiently identified by developing a few of the adjacent peaks or lobes. To do this requires a frequency selective system capable of passing the extremely narrow band, for example, 40 to 50 cycles per second, or the like, while substantially discriminating against all others. Furthermore, since the frequency range of various transients is different, the selective system must be capable of such variation.

It will be understood of course, that desired transients may lie at various regions in the frequency spectrum and also be of different band widths.

In accordance with the present invention there is provided a system capable of selecting such wave transients of varying amplitude and frequency and distinguishing them from other waves which may be masking them. The system comprises a means for detecting or picking up waves in a frequency range broad enough to be selected. The waves thus picked up by the detecting means are sent into a transmission medium and divided into a plurality of channels. A feature of the arrangement resides in the provision of polarity reversing means and time delay means and amplitude changing means in at least some of the channels so that the waves can be sent through the channels with different relative time relays, amplitudes and polarities. The waves from the channels are then combined to create a composite wave; and by proper selection of the time delays, amplitudes and polarities the transient can be developed from the random masking waves.

Another feature which it is possible to attain in accordance with the invention resides in combining wave information varying in space as well as in time. For example, a number of detectors can be located at different positions in space while the outputs of individual ones of the detectors are divided into separated channels whose transmissions are varied in time by time delaying means.

In a preferred arrangement of the invention the waves picked up by the detector are recorded, at least temporarily, on a recording medium of a type which can be played back. The record thus made is played back through a plurality of channels for the purpose of making a composite wave which can be made to appear on another record; and this is done in such a manner that the desired frequency range is selected while waves of other frequencies which may be masking the desired signal are substantially attenuated or cancelled out.

A preferred feature of the invention resides in a plurality of playback pickup elements arranged to have their positions adjusted relatively to each other along the record being played back. In this manner there are simultaneously picked up a plurality of different increments of the record spaced from each other by adjustable distances representing different time intervals.

The outputs of the several playback pickup elements are added or combined into a composite signal of which the second record is made. The selected wave or transient will appear on this second record, and will stand out from any masking waves, which are substantially minimized or cancelled.

Another feature resides in means for reversing the relative polarities of some or all of the several record signals picked up on the playback.

A related feature resides in means for adjusting the relative gain or amplitude of the signals from the several playback pickup elements.

The foregoing and other features of the invention will be better understood from the following detailed description and the accompanying drawings, of which:

Fig. 1 shows in block diagram form a known system for receiving and recording waves;

Fig. 2 shows a record of waves made on the system of Fig. 1;

Fig. 3 is a block diagram of a system for recording received waves on a magnetic tape;

Fig. 4 shows an elevation view of the system of Fig. 3;

Fig. 5 shows in block diagram form a system for playing back the tape of Figs. 3 and 4;

Fig. 6 shows a record made on the system of Fig. 5, in accordance with the present invention;

Fig. 7 shows graphically an enlarged wave on the record of Fig. 6, showing the relative amplitudes and time distances of peaks in the wave;

Fig. 8 is a curve showing an attenuation characteristic of the system of Figs. 3 to 5;

Fig. 9 is a block diagram of a system used according to the invention, for recording received waves on a magnetic tape record, which can be used in place of the system of Fig. 3;

Fig. 10 shows an arrangement according to the invention for playing back the magnetic tape record of Fig. 9;

Fig. 11 shows another arrangement according to the invention which can be used in place of that shown in Figs. 3 to 5;

Fig. 13 shows a modification which can be used in the system of Fig. 11;

Fig. 14 shows an arrangement for recording and playing back a magnetic tape record where a number of wave receiving detectors are used;

Figs. 15, 16, 17, 18 and 19 show attenuation characteristics of systems according to this invention;

Fig. 20 shows schematically an arrangement of magnetic heads in accordance with the invention;

Fig. 21 shows another arrangement of magnetic heads according to the invention;

Fig. 22 shows in block diagram form a further system in accordance with the invention; and Fig. 23 shows in block diagram form another system according to the invention.

Figure 12:
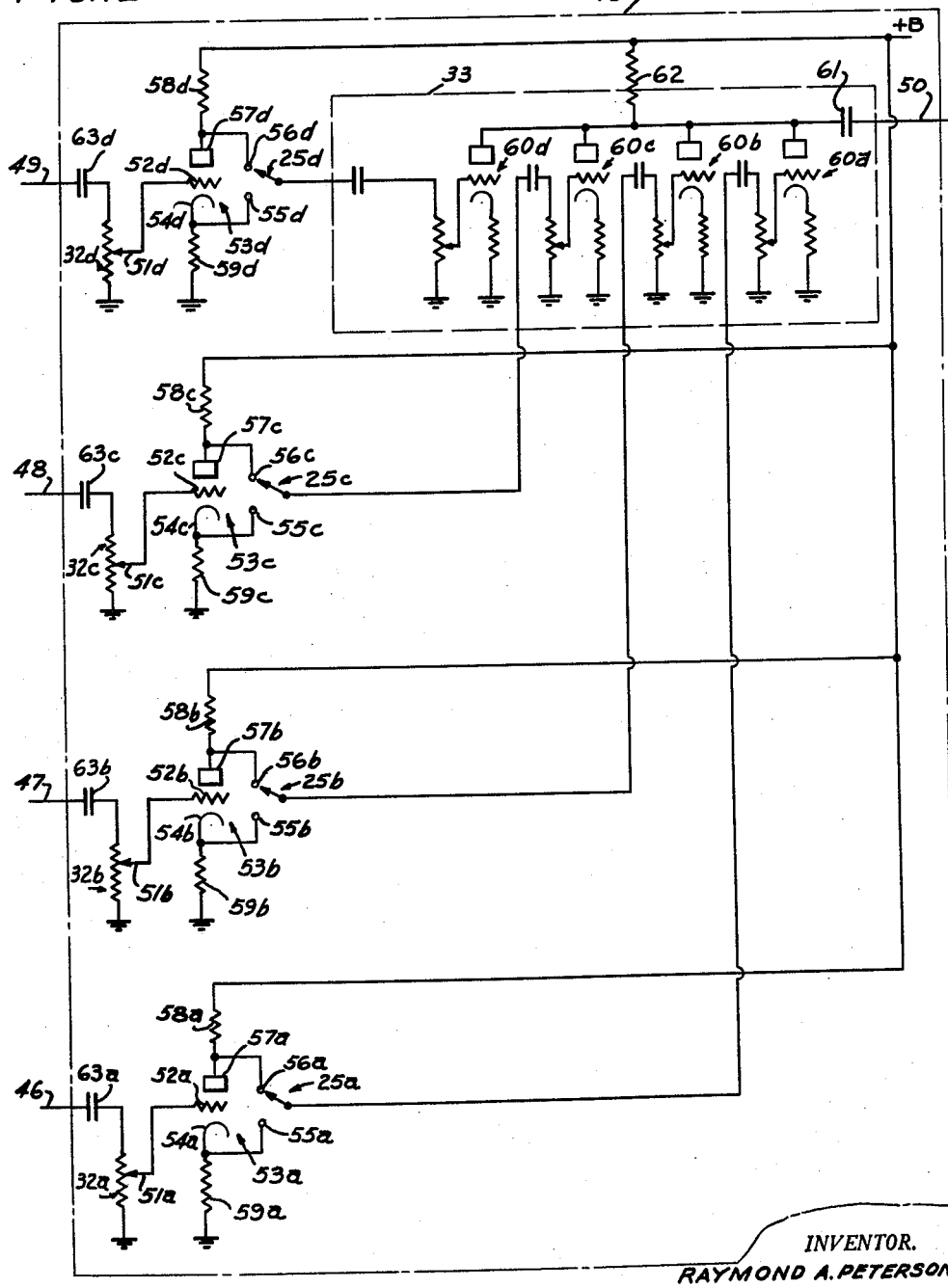
Fig. 12 shows a specific circuit arrangement which can be used in the system of Fig. 11.

Fig. 1 shows schematically in single line diagram form a simple system of a well known type for detecting and recording random waves including desired transients propagated through a wave transmitting medium. It comprises a detector or pickup device 6 of the transducer type for receiving the random waves and translating them into corresponding electric waves. The received random waves may for example, be of the general type emanating from a disturbance in air, water or earth. Such waves travel in various directions through the medium and reflect or refract in a haphazard manner according to the presence and location of natural obstacles or phenomena, with the result that the waves reaching the detector are a random and complex composite of many waves both direct, refracted and reflected.

The electrical output of the detector is amplified in a suitable amplifier 7 in a well known manner and then carried to a recorder 8 where a record of the wave is made. Such an amplifier may be of a desirable type and may be provided with filters and an automatic volume control system, well known in the art. A common form of recorder useful for the purpose is the well known photographic type wherein a very light weight coil in a magnetic path receives the amplified output so that the coil oscillates in accordance with the electric waves. A very small mirror attached to the coil reflects a light beam 9 from a light source, casting a small spot of light on a strip 10 of sensitized photographic paper pulled in the direction of the arrows from a supply roller 11 and onto a rotating receiving roller 12. Such a system is the general type commonly used in seismographic recording systems.

The strip 10 bearing the record made by the equipment of Fig. 1 is illustrated in Fig. 2. This comprises a trace 13 in undulating form representing the composite of all the received waves. In the absence of any received waves, the photographic trace will be steady and aligned with the direction of movement of the paper strip, forming the straight line 14. At a point 15 the first impulse from the disturbance in the medium will be received and thereafter the waves representing the composite of the disturbance waves will be traced along the paper so long as the disturbance is received while the system of Fig. 1 is operated. Vertical lines 16 are commonly impressed on the photographic paper and these can conveniently be spaced a distance apart representing time intervals along the paper. For example, the lines can be spaced so that the distance between each line represents, for example, one-hundredth second at the speed at which the paper 10 is travelling past the light beam.

The foregoing described system and arrangement is well kown notably in seismographic work, particularly in prospecting for subsurface formations by the seismic wave method. The system is not necessarily limited, however, to seismographic operation, as it is applicable to wave propagation in other media than the earth.

From a record such as that of Fig. 2 information can be gleaned concerning the nature of a wave disturbance and its path of travel and materials or objects encountered or traversed by the waves. For example, in the range $t$ in Fig. 2, shown as having a time range of a few hundredths seconds, if it be assumed that each vertical line 16 represents .01 second, there appears certain wave undulations and upon a close inspection it may be deduced that somewhere in that range $t$ a new wave has arrived which is of a different type or character from those waves which have previously arrived and which may also still be arriving in the same time range $t$. However, the precise place of arrival of the new wave on the record is difficult to ascertain and furthermore, its transient form is almost indistinguishable in view of the fact that it is obscured or masked by the random waves being received. In many records, such new arrivals may be so obscured by the masking waves that they can scarcely be ascertained. It would be very desirable to be able to select or filter out the initial transient of this newly arriving wave, as desirable information may be obtained from it. For example, in the case of seismographic work the newly arrived wave in region $t$ may be caused by a reflection of a wave front from the original disturbance from some particular sub-surface formation as to which it is desired to have information. The precise time of arrival and the shape of the reflected wave may give such information. Ordinarily the first few cycles of such a transient are characterized by peaks of varying amplitude and varying time distances apart; that is, the frequency usually varies within a narrow range of, for example, 40 to 50 cycles per second.

In accordance with the present invention, there is provided a way of selecting such a transient from undesired waves which may be masking it. This is done according to a preferred embodiment of the present invention by making a reproducible record of the received random waves with the transient included, and then playing back the record with a filtering action such that only the relatively narrow frequency range occupied by the desired transient is passed, all other frequencies being substantially attenuated or cancelled.

Figs. 3, 4 and 5 show an arrangement for doing this. This is like the system of Fig. 1 in having the detector 6 and amplifier 7; but instead of the recording device 8 making a permanent photographic record on the strip 10, there is substituted a record 17 which can be played back to make the permanent record. The recording medium 17 may be a suitable means which can be reproduced such as the well-known wax phonographic record, or a photographic film strip on which the record is placed in "sound track" form, such as the well-known variable density or variable area type; or it may be the magnetic wire or tape type on which the waves are recorded as varying increments of magnetic intensity. Of the various reproducible record means which are available, the magnetic tape form 17 is ordinarily preferred on account of its several mechanical advantages over other recording media. A great advantage of it resides in the fact that records made on it can be allowed to remain only temporarily. After making a record on it and playing it back, the record can be "wiped out" magnetically, in a well-known manner, so that the same tape is ready for a new record. Another advantage of the magnetic tape is that many records can be made side-by-side on one tape.

Such a tape is shown as an endless tape (Fig. 4) held on rolls 18 and 19 one or both of which may be used as drivers to drive the tape in the direction of the arrows. There is placed over the tape a suitable recording head 20 such as is commonly used in connection with magnetic wire or tape recording devices. Such a recording head is well known and comprises a magnetic member to which is related a coil on which is impressed the received and amplified electric waves; and the magnetic field of the core, varied in accordance with electric oscillations impressed on the coil, is placed in proximity to the tape travelling past it so that the successive elements of the tape passing beneath the head are subjected to the variations of magnetic flux along the line of travel of the tape. It will be understood of course, that when an endless tape is used the record should ordinarily be made within one complete revolution of the tape; for it will be apparent that any overlap of recording would have the effect of wiping out the part of the record overlapped.

Fig. 5 shows a top view of tape 17 containing the invisible magnetic record indicated by dotted line 21, made by recording head 20. For the purpose of playing back this record there are provided a plurality of pickup heads 22a, 22b, 22c and 22d, each of which can be similar to recording head 20. These four heads are spaced apart from each other on the record by respective distances $d_1$, $d_2$, and $d_3$, so that head 22a first plays back a given increment of the record, followed by playback of the same increment at successive time intervals by the remaining heads 22b, 22c and 22d as determined by distances $d_1$, $d_2$ and $d_3$ and speed of record travel for the playback, which can be the same as the speed for recording. The outputs from the individual pickup heads are brought to respective amplifiers 23a, 23b, 23c and 23d, whose gains are separately adjustable, over separate electrical channels represented in single line diagram form as lines 24a, 24b, 24c and 24d; and each of these lines contains a respective polarity reversing switch 25a, 25b, 25c and 25d, so that the polarities of the pickup outputs arriving at the amplifiers can be changed relative to each other at will. The outputs of the amplifiers are combined at an impedance matching pad 26 (which may be a common arrangement of series and shunt resistances) where the signals are added algebraically and then carried over line 27 to recorder 8 which may be substantially similar to recorder 8 of Fig. 1. The photographic record made on photographic strip 10a will be a composite of the signals passed through the combining network.

Since the several pickups are spaced apart at different positions on the reproducible record of the waves received at detector 6, there is being recorded on the final record 10a at any instant, a single point resulting from increments of signal taken from different points along the reproducible record 17. Accordingly, the photographic record 28 (Fig. 6) on record 10a will look different from the record 13 made on the strip 10 by the system of Fig. 1. Furthermore, the record 28 made on strip 10a can be varied at will by the operator by changing the relative positions of the pickup heads 22a, 22b, 22c and 22d, and also by changing the relative polarities of their outputs and their respective amplitudes impressed on the combining network 26. The operator can, by manipulation of these three variable factors make different successive records such as 28 from the same intermediate record 17.

Assume now that it is desired to develop the newly arriving transient in region $t$ of Fig. 2, which will, of course, be present on the magnetic tape record 17 in magnetic form, if the detector 6 has put it on the magnetic tape 17, as in Fig. 3. It can be shown that the "best filter" for the separation of this transient from the masking waves is one whose frequency response has the same form as the frequency spectrum of the desired transient. (See "Extrapolation, Interpolation, and Smoothing of Stationary Time Series," by Norbert Wiener, published May 1950, jointly by The Technology Press of The Massachusetts Institute of Technology and John Wiley & Sons, Inc., New York, page 95). In the past, methods for effecting this separation have been inefficient. The requirements for a system which can accomplish these means are rigorous and consist in the following: The frequency response curve must be capable of being shifted uniformly and easily in the frequency spectrum, and the shape of the frequency response curve must be readily variable. It is a purpose of this invention to provide a system which is capable of approximating the desired frequency response and thereby separate the transient from the masking waves. The necessary flexibility in regard to the aforementioned requirements is provided in this system by the ease with which the play-back heads can be moved relative to one another; the fact that the relative amplitudes of the play-back signal can readily be varied; and the ability to reverse the polarities of the play-back signals.

Reference is now made to Fig. 7, which is an enlarged view of the desired transient, without any of the undesired masking waves, on the magnetic tape within the time interval $t$. It is shown to have the four alternate positive and negative lobes, which are the first four lobes of the transient. These lobes, in general have different amplitudes, and the vertical lines $c_1$, $c_2$, $c_3$, and $c_4$ through the lobe centroids $c$ are of varying times apart, as shown by the different distances $d_1$, $d_2$ and $d_3$. The term "centroid," as used herein, means the point of the area within a lobe which is the center of gravity of that area. The abscissas of the centroid usually coincide nearly, but not necessarily exactly, with the abscissas of the peak amplitudes of the respective lobes. The different time intervals between the successive centroids, however, do not ordinarily vary greatly and may lie in a comparatively narrow range corresponding, for example, to a frequency band of 40 to 50 cycles per sec.

The remaining random waves which are masking this transient in the over-all reception as shown by the record of Fig. 2, ordinarily occupy many other and widely different frequencies so that the random waves may cover a range of, for example, 20 cycles per second to 2000 cycles per second. Because of this, there is ordinarily relatively little of the undesired random waves within the particular narrow frequency band of a desired transient. Accordingly, if this transient or band of frequencies can be selected with good discrimination, undesired masking waves can be attenuated. To do this, the operator after inspection of an initial record made directly as in Fig. 1 or else played back from the record of Fig. 5 can inspect the transient within the range $t$ and estimate approximate time distances between the successive centroids of the transient. In making such a record for inspection purposes, any filtering means associated with the amplifiers or otherwise included in the line or channel should be set to pass a relatively wide frequency band, wide enough to permit an undistorted view of the transient. Then by making an arbitrary setting of the four pickup heads of Fig. 5 in this time relationship, and reversing polarities of the outputs from the second and fourth heads, he can make a record on strip 10a which will tend to develop the transient.

I have found that one simple method of setting the variables associated with play-back heads in the time scale, which provides approximately the desired results in the frequency scale, consists of the following steps:

(1) The play-back heads are spaced apart by time distances substantially equal to the time distances on the tape record of the successive centroids.

(2) The amplification factors of the amplifiers of the respective play-back heads are set substantially in proportion to the areas enclosed within the respective lobes of the transient.

(3) The polarities of the pick-up heads are made to correspond to the polarities of the respective lobes.

The spacings between adjacent playback heads can be changed at will, as by manipulation of handle means 70a, 70b, 70c and 70d (Figs. 5 and 10) attached to the respective heads. Furthermore, the relative polarities of any of the several heads may be changed as desired. Moreover, it will be understood that the relative amplitude of signal response from each head to be combined with each other may be varied at will.

In general, the arrangement of the plural pickup heads amounts to a wave filter, a portion of whose attenuation characteristic is shown in generalized form in Fig. 8 which is a plot of attenuation vs. frequency. This shows that there is a frequency pass band of relatively low attenuation.

The arrangement of the several pickup heads on a single magnetic record on the tape, as shown in Fig. 5, is not always the best way of carrying out the invention, particularly where a magnetic tape is used for the reproducible record. The reason for this resides in space considerations. The ordinary physical size of a head such as 22a–22d is such that the distance on the tape representing a given time interval such as .01 second, would usually have to be undesirably large in order for the heads to resolve the wave form. Usually such a time interval is represented by a linear length of the order of only about ⅛ inch on the record; and such a small dimension cannot accommodate an ordinary head. For this reason it will ordinarily be desirable to split the magnetic record 21 of Fig. 5 into several identical records 21a, 21b, 21c and 21d as shown by the dotted lines in Fig. 9, the number of these separate magnetic records being as great as the number of the pickup heads. The separated magnetic records are made by dividing the output of amplifier 7 into the four parallel channels, which are brought to separate recording heads 20a, 20b, 20c and 20d placed at spaced lateral distances across the tape 17 as shown in Fig. 9. Furthermore, the four heads may be staggered one behind the other in the longitudinal direction of movement of the tape, as shown, so that one will start at a position $S_a$, the second at a postion $S_b$, the third at a position $S_c$ and the fourth at a position $S_d$; and the distances S between adjacent starting points in the longitudinal direction of movement of the tape will ordinarily be the same between adjacent starting points. Since the four recording heads are all electrically in parallel the four magnetic records will be identical but displaced in longitudinal distance from each other by the distance S. It will be understood, of course, that the several distances S could be made unequal if desired, without affecting the operation.

In order to play back the records 21a, 21b, 21c and 21d with the same displacements $d_1$, $d_2$ and $d_3$ as is shown in Fig. 5, the four playback heads 22a, 22b, 22c and 22d will be spaced on tape 17 in the manner shown in Fig. 10; otherwise, the playback system comprising the reversing switches, amplifiers, combining network and recorder (not shown in Fig. 10) can be the same as that shown in Fig. 5. In Fig. 10, the spacings between adjacent playback heads in the direction of movement of the record, instead of being $d_1$, $d_2$ and $d_3$ as in Fig. 5, will be $S+d_1$, $S+d_2$, and $S+d_3$, respectively. This arrangement will produce the same record 28 on photographic strip 10a as is shown in Fig. 6.

Since the wave information of the single wave train from each detector may be placed on a record as a single reproducible wave train, as in Figs. 5 and 6; or alternatively, may be divided into a plurality of wave trains on a reproducible record or recording means as in Figs. 9 and 10, it will be convenient to employ terminology in this specification and appended claims which will be readily understood in reference to these situations. The term "record means" signifies any media (such as one or more magnetic tapes) on which the wave information is placed. The term "wave train means" refers to the impression on the "record means" by which the wave train information of a single wave train is present on the record means; and it covers the impression of the wave train information either in the form of a single trace, as for example in Figs. 5 and 6, or in divided tracks, as in the case of the plurality of separate but identical wave train tracks, as for example in Figs. 9 and 10.

Fig. 11 illustrates a system in which an oscillator-modulator is used so that the undulations which are recorded on the tape are the frequency of the oscillator modulated by the signals picked up from the detector. The system is shown in an arrangement analogous to that of Figs. 9 and 10 in that provision is made for separating the signals from the detector into four separate traces on the tape (the tape not being shown in Fig. 11). The output of the amplifier 7 is brought to a modulator-oscillator 30, and the output of the oscillator-modulator is divided into four parallel channels leading into the respective recording heads 20a, 20b, 20c and 20d, as in Fig. 10.

The oscillator-modulator is preferably of the frequency-modulated type although it will be understood some other form of modulation could be used such as the well known amplitude modulation, phase modulation, pulse width ratio modulation, pulse code modulation, repetition rate modulation. The mean frequency of the oscillator can conveniently be about 5000 cycles per second, and the system can conveniently be designed so that when frequency-modulated by the output of the detector through amplifier 7, the frequency will swing in a range of about 3000 to about 7000 cycles per second. Such an oscillator-modulator arrangement is well known and needs no further description here.

It will be understood, of course, that the oscillator-modulator arrangement of Fig. 11 could as well be applied to the more fundamental arrangement of Figs. 3 to 5.

The traces made on the magnetic tape record by the heads, will then be the same as the traces made on record 17 of Fig. 9 except that the undulations instead of representing the frequencies and amplitude of the detector output will be the modulated oscillator frequency.

For playing back such signals there can be used the playback heads 22a, 22b, 22c and 22d, similar to the same numbered heads in Fig. 10 and similarly placed. The outputs of the playback heads will be brought to individual demodulators 31a, 31b, 31c and 31d which will serve to demodulate the signals picked up and thus produce in their outputs, signals which correspond with the signals picked up at the detector 6; modified, of course, by the action of circuit elements such as filters, amplifier characteristics or automatic volume controls associated with amplifiers. The outputs of the demodulators are brought to respective potentiometers 32a, 32b, 32c and 32d which can pass on to the reversing switches 25a to 25d as much of the demodulated signal as it is desired to impress on the adding or combining network 33. In this way the potentiometers have the effect of adjusting for the relative amplitudes of the respective traces which are impressed on the recorder 8.

A particular arrangement of the potentiometers, reversing switches and combining network 33 may be as shown in Fig. 12, wherein the elements within the dot-dash rectangle 45 are specific forms of the apparatus shown within the same numbered rectangle in Fig. 11. The respective leads 46, 47, 48 and 49 from the respective demodulators are brought to the respective potentiometers 32a, 32b, 32c and 32d through suitable isolating condensers 63a, 63b, 63c and 63d as shown; and adjustable taps 51a, 51b, 51c and 51d from the respective potentiometers are brought to the control grids 52a, 52b, 52c and 52d of respective vacuum tubes 53a, 53b, 53c and 53d.

The cathodes 54a, 54b, 54c and 54d of the tubes are connected to contacts 55a, 55b, 55c and 55d of the respective reversing switches 25a, 25b, 25c and 25d. The other contacts 56a, 56b, 56c and 56d of the reversing switches are connected with the respective anodes 57a, 57b, 57c and 57d. The anodes are all supplied with a source of positive voltage indicated as +B, this voltage being supplied through respective resistors 58a, 58b, 58c and 58d; and each cathode is connected to ground through a grid biasing resistor, these being numbered 59a, 59b, 59c and 59d, respectively.

This arrangement of the vacuum tubes is well known and is commonly called a phase splitter or inverter. With this arrangement, each cathode is 180° out of phase with the anode of the same tube. The result is that when a selected intensity or amplitude of signal voltage is taken from the respective potentiometer and applied to the control grid of the tube, the phases or polarities at the respective switch points such as 55a and 56a of a switch are opposite to each other; and thus the polarity can be selected by turning the switch arm such as 25a to the desired one of its two contacts.

The equipment of the adding network within rectangle 33 comprises vacuum tubes 60a, 60b, 60c and 60d which receive the outputs from the respective reversing switches, these reversing switch outputs being connected to the control grids of the tubes of the adding or combining network through suitable isolating condensers and with potentiometer type grid-leak resistors between control grid and ground, as shown; so that adjustment of the individual potentiometers can trim the gains of the individual tubes 60a to 60d to make them all alike. The cathodes have the usual resistors in series between ground to develop grid bias in a conventional manner. The outputs at the anodes are joined together and thus added, the total signal being carried through a condenser 61 to line 50 which supplies the recorder. Positive voltage for the anodes of these tubes is supplied from the source +B through a resistor 62.

It is entirely possible to use the same heads for both recording and playback, in all embodiments of the invention. Such an arrangement is shown in Fig. 13 wherein recording heads 20a to 20d and the playback 22a to 22d within dotted rectangle 34 are shown replaced by the elements within dotted rectangle 34a of Fig. 13. In Fig. 13, selecting switches 35a, 35b, 35c and 35d are associated with respective heads 20a, 20b, 20c and 20d so that when the switch is turned to the dotted line position, the heads are connected to output channel 36 from the oscillator-modulator 30 (Fig. 11). When turned to the full-line positions, however, the switches connect the heads through respective channels 37a, 37b, 37c and 37d leading to the respective demodulators. Such an arrangement avoids need for a set of playback heads separate from a set of recording heads.

An arrangement which may prove very desirable for seismic prospecting work wherein it is customary to use a number of detectors at spaced points on the ground to receive impulses from a single explosion, is that shown in Fig. 14. There, the magnetic heads are arranged in four blocks A, B, C and D, shown in staggered relationship across the magnetic tape 38, on account of space considerations. In the arrangement of Fig. 14, it is assumed that there are six detectors such as detectors 6 of Figs. 3, 9 or 11, and that the line from the output of each detector is divided into four parallel channels resulting in the four recording heads 20a, 20b, 20c and 20d as in Figs. 9 and 11. Each of these recording heads 20a, 20b, 20c and 20d is given a fixed position in an individual one of the blocks A, B, C and D of Fig. 14. Similarly, a second of the six detectors will have its output divided into four parallel channels leading to the respective recording heads 40a, 40b, 40c and 40d which are each given a fixed position in the respective blocks A, B, C, and D of Fig. 14. In similar fashion the third of the detectors will have respective recording heads 41a, 41b, 41c and 41d, each given a fixed position in the respective blocks A, B, C, and D. Thus, each of the four blocks can be provided with as many recording heads as corresponds to the number of detectors used, there being six recording heads corresponding to six detectors D, in the arrangement of Fig. 14. The number of blocks will correspond with the number of channels into which each detector output is divided, this number being four in the present example.

The heads in the blocks A, B, C and D can be arranged for playback as well as for recording by using the switching system such as that shown in Fig. 13.

For making the records on the tape the four blocks A, B, C and D will be given desired longitudinal positions on the tape which will be positions of convenience. Since the blocks are not moved laterally across the tape, no adjustments are possible in that direction. For playback, the several blocks will then be moved relative to each other from positions of recording, as has been explained above in order to produce the $S+d_1$, $S+d_2$ and $S+d_3$ relationships shown in Fig. 10. The arrangement is similar to those of Figs. 9 to 11 except that the heads of a plurality of detectors are moved in unison.

Means for moving blocks B, C and D relative to each other and to block A are shown in the form of threaded screws 71b, 71c and 71d threaded through threaded apertures in fixed members 72b, 72c and 72d, respectively. The ends of the screws have suitable flanges 73b, 73c and 73d fitted into respective sockets of members 74b, 74c and 74d attached to the respective blocks. By these means, turning of any of the screws in one direction or the other moves the respective block in the corresponding longitudinal direction. Since it is unnecessary to move block A this is shown in fixed position.

The systems involving the use of plural pickup heads spaced apart on a record by time distances are in effect wave filters whose frequency discriminating characteristics are dependent on factors of time spacing of the several playback heads, relative amplitudes of the playback signal at the combining network, and the relative polarities of the signals received from the playback heads at the combining network.

The great utility of this method of wave filtering lies in the flexibility of the system. It will be shown that many widely varying types of frequency response curves may be obtained by simple manipulation of the variables associated with the playback heads.

Figure 16:
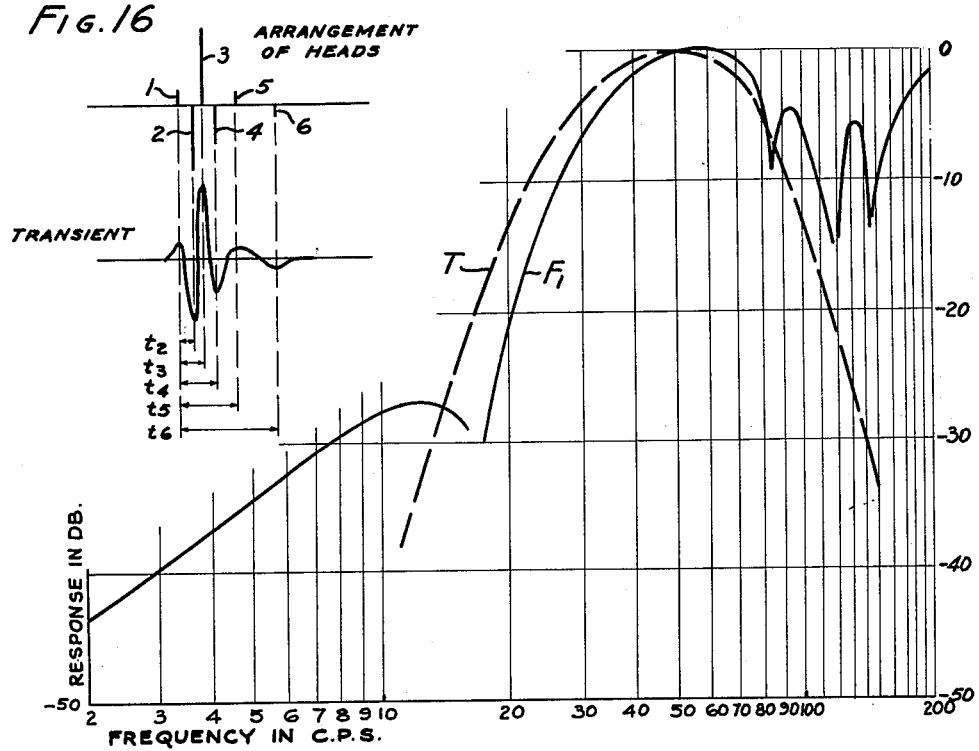
Figure 15:
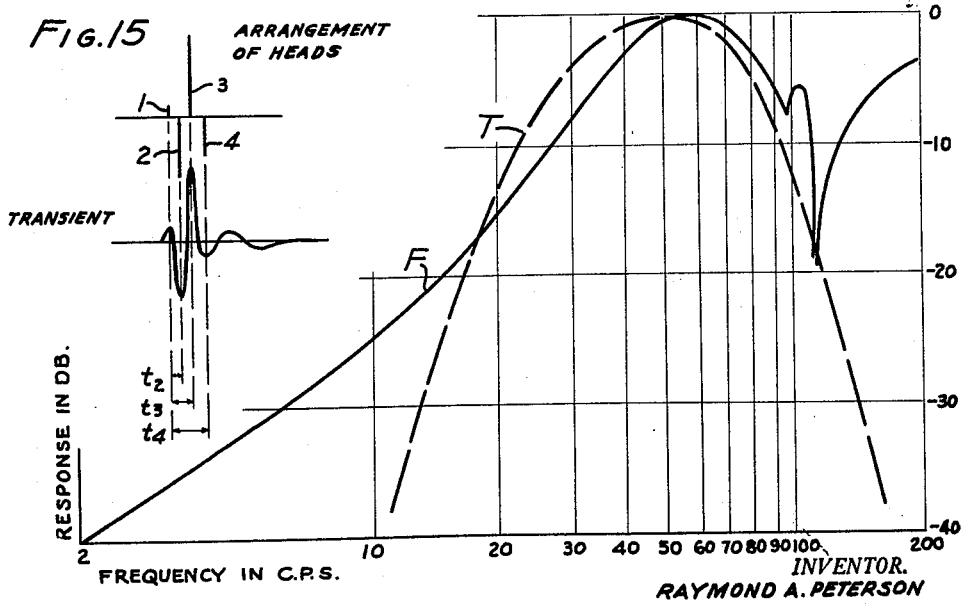

An example of the ease with which the frequency spectrum of a transient may be approximated is given in Figs. 15 and 16.

Fig. 15, for example, illustrates the frequency spectrum of a typical transient represented adjacent the graph, and also the frequency response of the composite of four heads 1, 2, 3 and 4, also represented adjacent the graph. In this head representation the lines 1, 2, 3 and 4 represent the outputs of the respective heads on playback as received at the adding or combining network, for example, the outputs from the four heads 20a, 20b, 20c and 20d respectively of Figs. 13 or 14. Those lines extending upwardly from the horizontal base line represent a positive polarity; and those lines extending downwardly from the base represent a reversed or negative polarity. The lengths of the lines indicate relative amplification associated with the respective heads, these relative amplitudes being herein referred to as $a_1$, $a_2$, $a_3$ and $a_4$, respectively. In this example, the values of these $a$'s have been set proportional the areas enclosed within the respective lobes of the transient. For example, $a_1$ is proportional to the area enclosed by the lobe corresponding to head 1; $a_2$ is proportional to the area enclosed by the lobe corresponding to head 2, etc. The time distances apart of the lines 1, 2, 3 and 4 represent head spacings, these being the same as the spacings between centroid lines of adjacent lobes of the transient. The time spacings of the successive heads from the first head are indicated on the graph as $t_2$, $t_3$ and $t_4$, respectively.

In the example for which the graph is given, the values of the time spacings and relative amplitudes producing the graph are:

$a_1=26.6$
$a_2=118.2$
$a_3=151.3$
$a_4=70.6$
$t_2=7.23$ milliseconds
$t_3=14.47$ milliseconds
$t_4=25$ milliseconds.

The curve T illustrates the frequency spectrum of the transient. The curve F illustrates the frequency response of the four heads as a filter. It is observed that in the frequency response region of the transient, the static filter characteristic of curve F closely coincides with the spectrum of the transient.

The higher frequency portions of the frequency response curve F may be readily removed by the use of well-known external filters, thus increasing the similarity between the two curves F and T. A similar type of external filtering can be applied at the lower frequencies, again increasing the degree of accuracy with which the response curve F duplicates the transient spectrum T. Such filtering means can be inserted, if desired, into line 50 at the position shown by the dotted rectangle 80 in Fig. 11.

I have found that a criterion for selection of the transient is this close correspondence of the filter response and the transient spectrum; and when there is close coincidence of the two, the filtering action of the four heads will effectively select and develop the transient.

An even closer approach to coincidence between the transient spectrum and filter characteristic can be had by increasing the number of heads. This is illustrated by the graph of Fig. 16 wherein six heads are used instead of four for developing the same transient as in Fig. 15. The first four heads of Fig. 16 have the same $a$ values and $t$ values as in Fig. 15. The additional heads 5 and 6 have the values $a_5=22.6$, $a_6=11.7$, $t_5=43.4$, and $t_6=61.84$. The curve $F_1$ representing the static filter characteristic coincides with the transient spectrum T even more closely than does the filter curve F in Fig. 15.

The response or amplitude Am. of the six-headed playback system, plotted as curve $F_1$ in Fig. 16 is given in db by:

Am.$=10 \log \{(a_1-a_2 \cos \omega t_2 + a_3 \cos \omega t_3 - a_4 \cos \omega t_4 + a_5 \cos \omega t_5 - a_6 \cos \omega t_6)^2 + (a_2 \sin \omega t_2 - a_3 \sin \omega t_3 + a_4 \sin \omega t_4 - a_5 \sin \omega t_5 + a_6 \sin \omega t_6)^2\}$ where $$\omega = 2\pi f$$

Again it is possible by simple external filtering means, for example at position 80 of Fig. 11, to make the lower frequency and higher frequency portions of the frequency response curve approximate closely the same respective portions of the frequency spectrum curve T.

It can be seen from these specific examples that the system proposed in this invention approximates very nearly the so-called "best filter," as previously described. The degree of approximation can be improved by increasing the number of playback heads. It has been found, however, that the approximation is very poor if the number of playback heads is less than three. In other words, to effectively separate the desired transient from the masking waves, it has been found impractical to use less than four playback heads, one for each of four lobes; and certainly there should never be less than three heads.

In the arrangements of Figs. 15 and 16, the time spacings between each two adjacent heads are unequal. Figs. 17, 18 and 19 illustrate attenuation characteristics by use of four playback heads on a record with an equal spacing $\Delta T$ between each adjacent two of the four playback heads. In the head arrangement of Fig. 17, the second fourth heads have their playback signals reversed in polarity, while the first and third heads have the positive polarity. Moreover, the playbacks from all heads are impressed on the combining network in the same relative amplitude; that is, the gain or the proportion of the playback voltage selected at each potentiometer is the same.

With this particular arrangement the amplitude of the signal sent to the recorder is expressed as:

Ampl.$=4 \cos (2\pi f \Delta T) \sin (\pi f \Delta T)$ $=4 \sin \left(\dfrac{\pi}{2}\dfrac{f}{f_o}\right) \cos \left(\pi \dfrac{f}{f_o}\right)$ where Ampl.$=$amplitude (voltage output to the recorder)

$\Delta T=$time interval between adjacent heads $f=$frequency $f_o=\dfrac{1}{2\Delta T}$ The graph shows the attenuation in decibels plotted against $$\dfrac{f}{f_o}$$

and is actually a plot of $20 \log \left[4 \sin \left(\dfrac{\pi}{2}\dfrac{f}{f_o}\right) \cos \left(\pi \dfrac{f}{f_o}\right)\right]$ versus $\dfrac{f}{f_o}$ normalized to the condition of:

0 decibels$=20 \log 4$

The graph of Fig. 17 shows that there are nulls or maximum attenuations at $$\dfrac{f}{f_o}=.5$$

and also 1.5, with a transmission band between them, the minimum attenuation being at $$\dfrac{f}{f_o}=1.0$$

In addition there are other higher frequency pass bands centered at $$\dfrac{f}{f_o}=3, 5, 7, 9, \text{etc.}$$

Ordinarily, the pass band centered at $$\dfrac{f}{f_o}=1$$

will be used; although other of the pass bands could be used instead if desired. Furthermore, any of the unused pass bands can be filtered out, if desired, by well-known filtering means.

Fig. 18 shows the change in the attenuation characteristic produced by reversing the relative polarities of playback heads at 3 and 4 from what they were for Fig. 17 while leaving the spacings $\Delta T$ the same. Under this condition, the pass bands have moved to different positions in the frequency spectrum, the nulls being located at $$\dfrac{f}{f_o}=1, 2, 3, 4, \text{etc.}$$

with pass bands between the adjacent null points.

In the particular arrangement of Fig. 18, the amplitude of the signal sent to the recorder is expressed as Ampl.$=8 \sin^2 (\pi f \Delta T) \cos (\pi f \Delta T)$ $=4 \sin \left(\pi \dfrac{f}{f_o}\right) \sin \left(\dfrac{\pi}{2}\dfrac{f}{f_o}\right)$ The graph shows the attenuation in decibels plotted against $$\dfrac{f}{f_o}$$

and is an actual plot of $20 \log \left[4 \sin \left(\pi \dfrac{f}{f_o}\right) \sin \left(\dfrac{\pi}{2}\dfrac{f}{f_o}\right)\right]$ versus $\dfrac{f}{f_o}$ normalized to the condition of 0 decibels$=20 \log 3.08$ Fig. 19 shows the attenuation characteristic produced by leaving the spacing $\Delta T$ the same as for the condition of Figs. 17 and 18, and also leaving the relative polarities the same as for Fig. 17, but increasing the amplitudes of the signal from the second and third heads to three times that of the first and fourth heads. Under this circumstance, nulls occur at $$\dfrac{f}{f_o}=2, 4, 6, 8, 10, \text{etc.}$$

with pass bands between them. Under this condition the amplitude of the signal sent to the recorder is expressed as $$\text{Ampl.} = 8 \sin^3 (\pi f \Delta T)$$
$$= 8 \sin^3 \left(\frac{\pi}{2} \frac{f}{f_o}\right)$$

and the graph is a plot of $$20 \log \left[8 \sin^3 \left(\frac{\pi}{2} \frac{f}{f_o}\right)\right] \text{ versus } \frac{f}{f_o}$$

normalized to the condition of $$0 \text{ decibels} = 20 \log 8$$

It will be observed that the pass bands are wider than in Fig. 17.

From the foregoing attenuation characteristics of Figs. 15 to 19 it is observed that changing either the relative amplitudes or the relative polarities of the playback heads changes the pass band width as well as the position in the frequency spectrum. Furthermore, an inspection of the fomulae shows that changing the $\Delta T$ also has the effect of changing the pass band width and the position of the pass band in the frequency spectrum.

Although the invention has been particularly illustrated and described by reference to the use of four playback heads in the block, it will be understood that a greater number of heads can be used if desired, and with the possibility of improved results. It has been found impractical to use less than four playback heads because less than this number does not properly bring out the shape of the wave transient. For some purposes it may be possible to show a part of the transient by the use of as few heads as three; although such a small number of heads is not recommended for effective filtering.

Furthermore, although wide latitude is permissible in the selection of relative polarities of the different playback heads in the group at least some diversity of polarity among the several heads of the group is ordinarily indicated for effective transient development.

It should be noted that the particular arrangement of playback heads described in the above examples can be modified or refined if desired. In the examples given above, there is shown the use of only one playback head for each lobe of a transient. It should be understood, however, that more than one head may be used to represent each lobe. Fig. 20, for example, shows a schematic arrangement of heads using two heads for each lobe. The heads 1a and 1b perform the work of head 1 in Fig. 15. Similarly the heads 2a and 2b perform the work of head 2 and so on.

Fig. 21 shows a further refined arrangement in which three heads per lobe are used. Thus, heads 1a, 1b and 1c do the work for the first lobe; heads 2a, 2b and 2c do the work for the second lobe, and so on.

It will be understood that in arrangements of multiple heads per lobe as illustrated in Figs. 20 and 21, the sum of the relative amplifications of all the heads of the group for a lobe should be about proportional to the lobe area, just as though a single head per lobe were being used. Thus, the total relative amplification of heads 1a and 1b in Fig. 20 should add up to that of head 1 in Fig. 15. Similarly the total amplification of heads 1a, 1b and 1c in Fig. 21 will add up to that of head 1 in Fig. 15. A similar relationship will apply to the other heads in Figs. 20 and 21.

In respect to the relative displacements of the heads on playback, the mid-heads of the lobe groups should be located to coincide approximately with the centroids of the respective lobes; that is, in the positions of the heads in Fig. 15. Thus, heads 1b, 2b, 3b and 4b of Fig. 21 will be displaced from each other about in the relative positions of heads 1, 2, 3 and 4, respectively, in Fig. 15. In the case of an even number of heads per lobe, as in Fig. 20, the heads for a lobe will ordinarily be evenly divided on either side of the centroid. In all cases all the heads of a lobe group will be located to lie within the base of the corresponding lobe.

It will be recognized that by the present invention there is provided a readily usable way of developing a transient wave from among random waves, in such a way that the features of the transient can readily be recognized, including the start of the transient and the shape, amplitude and time spacing of its adjacent peaks. In this way, much information is ascertainable about the wave, including the means or manner of its reflection or refraction or diffraction from objects and the location and form and characteristic of the object. The invention in particular provides an easily operable way of selecting the relatively narrow frequency range and the component peaks of the transient which factor may vary considerably.

It will be understood that variations may be made from the embodiments specifically disclosed, all within the scope of the invention; and the embodiments illustrated and described are given by way of illustration rather than of limitation.

The particular manner of moving the playback heads relative to each other along the direction of motion of the record may be selected at will.

Furthermore, the manner of changing the relative amplitude or gain of the individual playback signals can be modified or selected as desired.

Other means than a magnetic tape may be used for the reproducible record; and if the record material is changed, it will be understood, of course, that the recording and playback heads will correspondingly be changed from the magnetic heads to elements which are appropriate for the reproducible record material which is being used.

As has been noted heretofore, it is possible to develop the transient without the use of a magnetic tape or other form of recording medium for making a temporary record. The requisite division of the signal from a detector into several channels with attendant time delays for the respective channels, and amplification and polarity selections can be made in other ways. One such way is illustrated in Fig. 22 wherein the output of the amplifier 7 from detector 6 is divided into four channels in a manner similar to that of Fig. 11. But instead of including the magnetic tape recording heads 20a, 20b, 20c and 20d in the respective channels, as in Fig. 11, there are instead used time delay devices 81a, 81b, 81c and 81d in the respective four channels, the time delays of which may be made adjustable. No magnetic tape or other temporary recording medium need be used. Ordinarily all the channels will be provided with the time delay means, although in some cases the time delay device may be omitted or made non-adjustable in one of the channels. The relative amplitudes or gains at the four channels can be adjusted by adjustable potentiometers 32a, 32b, 32c and 32d, similar to the same numbered potentiometers of Fig. 11. The polarity reversing switches 25a, 25b, 25c and 25d may be similar to those of Fig. 11, and likewise the adding network 33 may be like that of Fig. 11.

Types of time delay producing device 81a to 81d, other than magnetic tape or other recording media, which may be used, are well known. For example, there can be used mercury delay lines, artificial transmission lines, acoustic delay producing devices, electric delay networks and the like.

Another expedient which may be useful with systems according to the present invention resides in the possibility of combining the outputs of several channels of information. For example, the outputs of two or more detectors can be combined. Such an arrangement is illustrated schematically in Fig. 23 wherein there are shown two detectors 6a and 6b in place of the detector 6 of Fig. 22. The output of detector 6a leads to elements within the dotted rectangle 82a, which elements can be the same as those within the dotted rectangle 82 of Fig.

22. The output of detector 6b is carried to elements within the dotted rectangle 82b which elements can similarly be the same as those within the dotted rectangle 82 of Fig. 22. The outputs of the elements in dotted rectangles 82a and 82b, instead of being led directly to the recording equipment 8 as in Fig. 22 are brought to a combining or adding network 83, the output of which is then carried to the recorder 8. It will be understood that any number of detectors such as 6a and 6b can be combined in an arrangement like that of Fig. 23 with their outputs brought to the network 83 for combination with the outputs from the other detectors.

The arrangement of Fig. 23 in effect combines wave information derived from different space and different time relationships. Thus, the several detectors such as 6a and 6b can be arranged in different positions in space, for example, at different positions along the ground in the case of seismic wave reception. Since the outputs from each individual detector are then divided into the several channels such as the four channels of Fig. 22 (or any other desired number of channels) and with the channels varied from each other in time by the time delaying means, there are thus produced the differences of time. By such a composite arrangement it is possible to develop much information in regard to transients which may otherwise be hard to obtain.

It will be understood, of course, that an arrangement such as that of Fig. 23 is applicable to the use of recording media such as magnetic tape, as to any other type of equipment capable of producing relative time differences.

It should be understood that the final record which is made to show the developed wave or transient need not necessarily be a photographic record, such as the record 10a of Figs. 5, 11, 22 and 23. Some other suitable recording medium might be used instead, if desired. It is possible, for example, to substitute an oscilloscope for the recorder 8, in which case the wave would be displayed only while the oscilloscope is turned on. It will be understood that the term "record" as used in this specification and in the claims to refer to the ultimate record of the selected wave or transient, denotes any such means for recording or displaying the wave.

It should be understood that the terms "waves," "masking waves," "wave transient" and the like, and their transmission and recording through channels or on records, as used in the appended claims, cover not only the waves in their original detected form, but also in their modified forms when modified by the presence of means such as described hereinabove as exist, for example, when they are subjected to amplification, filtering, time delay, phase shift or polarity reversal, or modulation and demodulation, or the like. Thus, the terms "waves" and "wave transient" include wave information resulting from the modulation and demodulation produced by the waves or transient. All such modifications of waves, as well as the original waves themselves, are encompassed in the expressions "wave information" or "signals."

In the several embodiments of the invention, the played-back wave trains in the several channels are used in their entirety in combining them with each other. The term "entirety" as used in this specification, and in the claims, means that in any wave train or portion thereof (any portion being a wave train in itself) which is used, all of the signal information or wave form in the utilized wave train or portion, including the transient, is utilized. It does not mean that a very long wave train must be used or even that the entire length or extent of a wave train which is recorded on a record need be used in the playback. Only enough extent of the wave train need be used which will enable the transient to be distinguished from other waves. In other words, the entire output of the channel is used, and the term "entire output" as used in this specification and claims, means the entire output of such wave train or portion thereof which is utilized. Again, it is not required that the entire length or extent of a wave train which is recorded need be played back, but only a sufficient extent of the wave train, including the transient, which will distinguish the transient from the surrounding waves. The "entire output" means all of the signal information or wave form in the wave train or part thereof which is played back.

The embodiments and methods described in the specification and shown in the drawings are for illustration, and not for limitation, of the invention. The invention is not limited except by the scope of the appended claims.

I claim:

1. The method of selecting a wave transient within a narrow frequency range from among undesired masking waves in a single wave train, which comprises receiving the wave train including the masking waves and the transient, recording wave information of the waves on a reproducible record means as a continuous wave train means, playing back the recorded wave information at a plurality of positions spaced apart in time along the wave train means, simultaneously combining the played-back wave information in its entirety and making a record thereof of said played back wave information.

2. The method of selecting a wave transient within a narrow frequency range from among undesired masking waves in a single wave train, which comprises receiving the wave train including the masking waves and the transient, recording wave information of the masking waves and transient on a reproductible record means as a continuous wave train means, playing back the recorded wave information from the record means at a plurality of positions along the wave train means and adjusting the respective spacings of said positions to develop the transient, said positions being related to each other in accordance with the positions of the centroids of the individual lobes of the transient, simultaneously combining the played back wave information in its entirety and making a record of said played-back wave information whereby the transient is accentuated in the last-mentioned record relative to the masking waves.

3. The method of selecting a wave transient within a narrow frequency range from among undesired masking waves in a single wave train, which comprises receiving the wave train including the masking waves and the transient, recording wave information of the masking waves and transient on a reproducible record means as a continuous wave train means, playing back the recorded wave information at a plurality of positions spaced apart in time along the wave train means, simultaneously combining the wave information in its entirety from the plurality of positions and adjusting the spacings between said positions and the amplitude and the polarity of the played back wave information to develop the transient from among the masking waves.

4. The method of selecting a wave transient within a narrow frequency range from among undesired masking waves, which comprises receiving the masking waves with the transient as a single wave train, dividing the wave train into a plurality of channels, recording wave information of the waves of the separate channels as separate identical wave trains on reproducible recording means, playing back the separate wave trains from the recording means, combining the played back wave trains in their entirety and adjusting with respect to time, the relative positions of the playback on the respective wave trains to develop the transient at the combined waves.

5. The method of selecting a wave transient within a narrow frequency range from among undesired masking waves, which comprises receiving the masking waves with the transient, dividing the received waves into a plurality of channels, recording wave information in the separate channels as separate but identical wave trains on a reproducible record, the corresponding increments of the separate wave trains being spaced on the record by distance intervals from each other, playing back the separate wave trains in their entirety from the record at different distance intervals than those used in the recording, and combining the played-back wave trains to produce a composite signal in which the transient is accentuated relative to the masking waves.

6. The method according to claim 5 in which the polarities of some of the played-back wave trains are changed prior to the combining.

7. The method according to claim 5 in which the relative amplitudes of the played-back wave trains are altered prior to the combining.

8. The method of selecting a wave transient within a narrow frequency range from among undesired masking waves, which comprises receiving the masking waves with the transient, dividing the received waves into a plurality of channels, recording signals of the waves of the separate channels as separate but identical wave trains on a reproducible record, producing signals by playing back the separate wave trains from the record, adjusting the relative polarities and amplitudes of the signals of the played back records, adjusting the relative positions of the played back records on the respective wave trains, and combining the signals of the adjusted played back waves in their entirety.

9. The method of selecting a wave transient within a narrow frequency range from among undesired masking waves, which comprises receiving the masking waves with the transient, recording wave information of the received waves and transient on a reproducible record as a continuous wave train, playing back the recorded wave information at a plurality of positions spaced apart from each other in time along the record, said positions being related to each other in accordance with the positions of the centroids of the individual lobes of the transient, adjusting the relative polarities of the playback wave information in accordance with the polarities of said individual lobes, adjusting the relative amplitudes of the playback wave information in accordance with the areas of said individual lobes and simultaneously combining the played back wave information in its entirety to develop the transient from among the masking waves.

10. The method of selecting a wave transient within a narrow frequency range from among undesired masking waves in a single wave train, which comprises receiving the wave train including the masking waves and the transient, dividing the received wave train into a plurality of channels arranged in parallel with each other, introducing different relative time delays into different ones of the channels, then recombining the channels, and producing a record which is a composite of the waves in their entirety from the recombined channels.

11. The method of selecting a wave transient within a narrow frequency range from among undesired masking waves, in a single wave train, which comprises receiving the wave train including the masking waves and the transient, dividing the received wave train into a plurality of channels arranged in parallel with each other, introducing different relative time delays into different ones of the channels and adjusting the relative time delays to be the same as the respective time delays from a reference time, of the centroids of individual lobes of the transient, then recombining the channels, and producing a record which is a composite of the waves in their entirety from the recombined channels.

12. The method of selecting a wave transient within a narrow frequency range from among undesired masking waves in a single wave train, which comprises receiving the wave train including the masking waves and the transient, dividing the received wave train into a plurality of channels arranged in parallel with each other, introducing different relative time delays into different ones of the channels, adjusting the relative time delays, polarities and amplifications in the individual channels in accordance with the positions of the centroids of the individual lobes of the transient, then recombining the channels, and producing a record which is a composite of the waves from the recombined channels.

13. The method of wave selection which comprises receiving waves including the waves to be selected, at a plurality of positions spaced apart in distance from each other, dividing the received waves at each of said positions into a plurality of channels arranged in parallel with each other, introducing time delays into different ones of the channels, adjusting said time delays, and adjusting the polarities and amplifications in different ones of the channels, then combining the outputs of the channels, and producing a record which is a composite of the waves from the combined channels.

14. The method of wave selection which comprises receiving waves including the waves to be selected, at a plurality of positions spaced apart in distance from each other, dividing the received waves at each of said positions into a plurality of channels arranged in parallel with each other, introducing time delays into the channels from one of said positions, relative to the time delays in the channels from another of said positions, then combining the outputs of the channels, and producing a record which is a composite of the waves from the combined channels.

15. A system for selecting a wave transient which is masked by undesired waves, said system comprising means for receiving a wave train including the masking waves and the transient, means for recording signals from the wave train with the transient as a wave train means on a strip of magnetic material, a plurality of playback means for playing back the wave train means of the record upon relative movement of the record to the playback means, means for shifting the relative positions of the playback means in the direction of the movement of the record, means for combining the signals from the playback means in their entirety, switching means interposed between each playback means and the combining means for reversing the polarity of the signal, and means interposed between each playback means and the combining means for adjusting the amplitude of the signal from the respective playback means.

16. A system for selecting a wave transient which is masked by undesired waves, said system comprising a pickup element which detects a wave train including the masking waves together with the transient, amplifying means for amplifying the received wave train, a strip of magnetic recording material, a recording head means connected to receive signals from the output of the amplifier and arranged in relation to the strip to record a continuous wave train means on the strip, a plurality of playback heads related to the wave train means on the strip, means for shifting the positions of the playback heads relative to each other in the direction of movement of the strip, a reversing switch and an amplitude adjusting means at the output of each playback means, a combining network into which the outputs of the playback heads after passing through the reversing switch and the amplitude adjusting means pass in their entirety, whereby a composite signal is provided at the output of the combining means delineating the transient from the undesired waves.

17. A wave filter for selecting a band of frequencies, comprising a line for carrying the waves to be selected, means dividing said line into a plurality of separate channels arranged in parallel with each other, means adjusting the relative time delays in the separate channels, means adjusting the relative amplifications in the separate channels, means for reversing the relative polarities in the separate channels, means recombining the entire outputs of the separate channels into a single line, and means displaying a record of the waves in said single line.

18. Filtering means for selecting a band of frequencies, comprising a plurality of wave transmission lines, detecting means for picking up waves to be supplied to the respective lines, means dividing each of said lines into a plurality of channels arranged in parallel with each other, means adjusting the relative time delays in the respective channels, means adjusting the relative amplifications in the respective channels, means for reversing the relative polarities in the respective channels, means combining the entire outputs of the channels of each line and means displaying a record of the waves at the output of said combining means.

References Cited in the file of this patent

UNITED STATES PATENTS

| Number | Name | Date |
|---|---|---|
| 2,243,730 | Ellis | May 27, 1941 |
| 2,275,735 | Cloud | Mar. 10, 1942 |
| 2,351,456 | Ricker | June 13, 1944 |
| 2,394,990 | Eisler et al. | Feb. 19, 1946 |
| 2,406,353 | Myers | Aug. 27, 1946 |
| 2,558,868 | McCarty | July 3, 1951 |
| 2,620,890 | Lee et al. | Dec. 9, 1952 |
| 2,628,689 | Rieber | Feb. 17, 1953 |
| 2,638,402 | Lee | May 12, 1953 |
| 2,672,944 | Minton | Mar. 23, 1954 |
| 2,757,357 | Peterson | July 31, 1956 |
| 2,794,965 | Yost | June 4, 1957 |
| 2,882,988 | Dobrin | Apr. 21, 1959 |

UNITED STATES PATENT OFFICE
CERTIFICATE OF CORRECTION

Patent No. 2,916,724                          December 8, 1959

Raymond A. Peterson

It is hereby certified that error appears in the printed specification of the above numbered patent requiring correction and that the said Letters Patent should read as corrected below.

Column 16, line 22, strike out "thereof".

Signed and sealed this 29th day of November 1960.

(SEAL)
Attest:

KARL H. AXLINE
Attesting Officer

ROBERT C. WATSON
Commissioner of Patents